(No Model.)

J. M. ORDWAY.
NON-CONDUCTING COMPOSITION FOR REFRIGERATORS, &c.

No. 310,461. Patented Jan. 6, 1885.

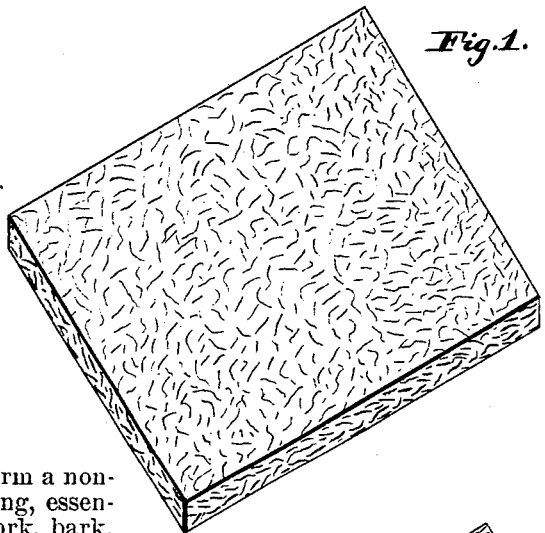
Fig. 1.

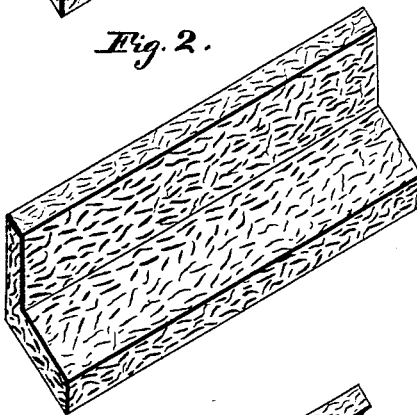
Fig. 2.

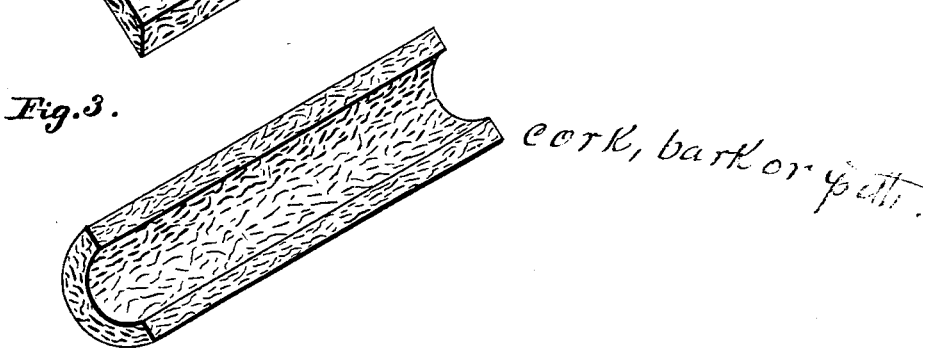
Fig. 3.

Granulated cork, pith & bark, water glass, Soda or Potash 1.35° o/o Sp. gr.

Lining of fossil or magnesia cork, bark or pith

1. A composition of matter to form a non-conductor of heat or sound, consisting, essentially, of a mixture of granulated cork, bark, or pith and water-glass, shaped and dried substantially as set forth.
2. A non-conducting coating of granulated cork, bark, or pith agglomerated by water-glass, in combination with a lining of fossil-meal or magnesia, as specified.

WITNESSES
P. W. Hale,
F. D. Ellsworth.

INVENTOR
John M. Ordway
by R. K. Evans
his Attorney

JOHN M. ORDWAY, OF BOSTON, MASSACHUSETTS.

NON-CONDUCTING COMPOSITION FOR REFRIGERATORS, &c.

SPECIFICATION forming part of Letters Patent No. 310,461, dated January 6, 1885.

Application filed October 2, 1884. (No model.)

*To all whom it may concern:*

Be it known that I, JOHN M. ORDWAY, of Boston, in the county of Suffolk and State of Massachusetts, have invented a new and Improved Composition of Matter to be Used as a Non-Conductor of Heat and Sound; and I hereby declare the following to be a full, clear, and exact description of the same, reference being had to the accompanying drawings, making part of this specification, in which—

Figure 1 illustrates my improved non-conductor in slabs, to be introduced into the floors and walls of buildings, and for linings. Figs. 2 and 3 illustrate the same in forms to be applied to angular and curved surfaces.

My invention relates to the insulation of heat and sound, and has for its object to provide a non-conducting covering for refrigerators, safes, and similar uses, and also a deadener of sound for filling the spaces in the walls and floors of buildings.

My invention consists in a combination of granulated cork or other barks, or of the cellular pith of plants, with water-glass, formed and "set" in proper shape to conform to the refrigerator, pipe, boiler, or wall-space to which it is to be applied.

To enable others skilled in the art to make and use my invention, I will proceed to describe the manner in which I have carried it out.

I take fragments of cork, bark, or pith and reduce them by cutting or grinding to such a size that they will pass through a sieve having four meshes to the square inch, though the size may be varied to suit the ideas and purposes of the maker without departing from the spirit of my invention. I moisten this coarse powder with somewhat more than its own weight of potash or soda water-glass of about specific gravity 1.35°, and preferably press the mixture into molds of suitable form, having previously lined the molds with paper to prevent adhesion and facilitate the removal of the molded mass from the mold. I then dry the molded article in the air or by artificial heat and it is ready for use.

For deadening walls or lining refrigerators and safes I mold the composition into flat slabs of a suitable thickness and convenient size.

For covering pipes I mold the mass into semi-cylinders of convenient length and suitable thickness; so that the semi-cylinders or halves may be put on around the pipe and secured together by ties of twine, wire, paper, or cloth.

In preparing the covering to be used on high-pressure steam-pipes I prevent the alteration of the organic matter, through long-continued heating, by facing the inner surface of the composition pipe with "fossil-meal" or magnesia. To accomplish this, I first mold the composition pipe so that the inner diameter may be from one-half of an inch to an inch greater than that of the exterior of the pipe to be covered. When the halves of the composition pipe are dry and hard, I plaster the inner surface with fossil-meal or magnesia, made into a thick paste with water, or a very dilute solution of water-glass, and shape this coating so that it will exactly fit the pipe to be covered.

I find it advantageous, sometimes, to mold the covering directly on the steam or other pipe, and thus make it whole and tight-fitting. For this purpose I take a wire cage consisting of wire-gauze of about eight meshes to the linear inch, bent to the form of a half-cylinder of a diameter half an inch or an inch greater than that of the pipe. I hang this cage, which may be two or three feet long, under the pipe, so that the curvature of the pipe and the curvature of the cage are paralleled. I then put into the cage a long strip of paper of a width equal to the circumference of the fossil-meal covering to be made. I then crowd the fossil-meal or magnesia paste into the space between the paper and the pipe, and plaster the mixture over the other or upper half of the pipe. I then bring the two edges of the paper together over the top of the paste covering, and paste a narrow strip of paper along over the junction of the two edges. The wire cage is then loosened and moved along to mold another length of the meal coating. When the fossil-meal or magnesia coating is dry, I hang on another wire-cage of proper size and lay in it a strip of cloth. I then crowd in between the cloth and the fossil-meal or magnesia coating the moist silicated composition, heap up the same over the top, bring up the edges of the cloth and sew them together.

The cage may then be loosened and moved along.

I do not limit myself to any exact proportions of vegetable matter and water-glass; nor do I confine myself to water glass of any precise composition. It is only necessary that the silicate of potash or soda be present in sufficient quantity to coat every particle of the vegetable matter, so as to make it uninflammable, and that the water-glass solution be of sufficient strength to cause the particles to adhere in a firm solid mass when the whole is dry.

Having thus described my invention, what I claim as new, and desire to secure by Letters Patent, is—

1. A composition of matter to form a non-conductor of heat or sound, consisting, essentially, of a mixture of granulated cork, bark, or pith and water-glass, shaped and dried substantially as set forth.

2. A non-conducting coating of granulated cork, bark, or pith agglomerated by water-glass, in combination with a lining of fossil-meal or magnesia, as specified.

JOHN M. ORDWAY.

Witnesses:
CHAS. HALL ADAMS,
JOHN H. MOONEY.